United States Patent
Bussing et al.

[11] Patent Number: 5,901,550
[45] Date of Patent: *May 11, 1999

[54] LIQUID FUELED PULSE DETONATION ENGINE WITH CONTROLLER AND INLET AND EXIT VALVES

[75] Inventors: Thomas R. A. Bussing, Issaquah; Thomas E. Bratkovich, Bellevue, both of Wash.

[73] Assignee: Adroit Systems, Inc., Alexandria, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/618,001

[22] Filed: Mar. 18, 1996

Related U.S. Application Data

[63] Continuation-in-part of application No. 08/205,505, Mar. 4, 1994, Pat. No. 5,513,489, which is a continuation-in-part of application No. 08/045,771, Apr. 14, 1993, Pat. No. 5,345,758.

[51] Int. Cl.$^6$ ....................................................... F02C 5/02
[52] U.S. Cl. ........................ 60/39.38; 60/39.39; 60/39.76; 60/39.78
[58] Field of Search ............................... 60/39.38, 39.39, 60/39.76, 39.78, 39.79, 39.8, 39.821, 39.826, 39.827; 431/1, 158, 278, 280

[56] References Cited

U.S. PATENT DOCUMENTS

| | | | |
|---|---|---|---|
| 1,552,272 | 9/1925 | Carner | 60/39.39 |
| 1,731,778 | 10/1929 | Holzwarth | 60/39.79 |
| 2,557,198 | 6/1951 | Nichols | 60/39.39 |
| 2,888,803 | 6/1959 | Pon | 60/39.38 |
| 2,930,196 | 3/1960 | Hertzberg et al. | 60/39.39 |
| 4,510,748 | 4/1985 | Adams | 60/79.76 |
| 4,570,438 | 2/1986 | Lorenz | 60/39.39 |
| 4,693,075 | 9/1987 | Sabatiuk | 60/39.39 |
| 4,807,440 | 2/1989 | Salem | 60/39.76 |
| 4,947,641 | 8/1990 | Rodgers | 60/76.76 |
| 5,513,489 | 5/1996 | Bussing | 60/39.38 |

*Primary Examiner*—Timothy S. Thorpe
*Assistant Examiner*—Ted Kim
*Attorney, Agent, or Firm*—Christensen O'Connor Johnson & Kindness PLLC

[57] ABSTRACT

The invention provides a liquid fueled pulsed detonation air breathing engine. The engine has at least one, and preferably a multiplicity of, detonation chambers, each of which has an inlet end for opening and receiving a charge of fuel and air, and an outlet end for discharging combustion product gases. A fast-acting valve is located above the inlet ends of the detonation chambers and cyclically opens the fuel and air receiving openings in the inlet ends of the detonation chambers to allow a fuel/air charge to enter the chambers. In a preferred embodiment, the valve is of a rotary type with a body that has at least one opening through which fuel and air can flow into the inlet end of the detonation chamber. Once the valve has closed, detonation is initiated by an ignitor and impulse force is provided by the resultant shock wave. Thereafter, the valve opens again so that the detonation chamber can be charged with fuel and air to recommence the cycle. The invention also provides an embodiment of an engine that has both inlet and outlet valves. These valves operate out of phase so that when the inlet valve is open to receive fuel and air into the detonation chamber, the outlet valve is closed. When detonation commences, the outlet valve is open and the inlet valve is closed. Optionally, a source of oxygen allows a stratified charge in the engine to enhance detonation. Also provided is a control system (48) for sensing the position of the valves, (58, 80) and using this sensed position to inject fuel, inject oxygen and ignite the fuel and air mixture.

25 Claims, 9 Drawing Sheets

LIQUID FUELED PULSE DETONATION ENGINE WITH CONTROLLER AND INLET AND EXIT VALVES

This application is a continuation-in-part of Ser. No. 08/205,505 filed Mar. 4, 1994, now U.S. Pat. No. 5,513,489, which is in turn a continuation-in-part of Ser. No. 08/045,771 filed Apr. 14, 1993, now U.S. Pat. No. 5,345,758.

FIELD OF THE INVENTION

The invention relates to intermittent combustion engines wherein the combustion products provide a motive force. More particularly, the present invention provides an air-breathing liquid fueled pulsed detonation engine.

BACKGROUND OF THE INVENTION

Jet engines may be divided into two classes: deflagrative and detonative combustion engines. Deflagrative engines are well known and are typically used in commercial jet airliners, for instance. In a deflagrative engine, the combustion process produces combustion product gases that are propagated at velocities in the range of a few feet per second. These gases provide motive force for a vehicle to which the engine is mounted.

In contrast, in a pulse detonation engine, motive force is provided by combustion products that result from a detonation process. These combustion products are propagated at velocities very much higher than the combustion products of deflagrative processes. Indeed, typical velocities are of the order of several thousands of feet per second. U.S. Pat. No. 5,345,758 of T. R. Bussing (hereby fully incorporated by reference to the extent consistent with the invention disclosed and claimed below) describes a pulse detonation engine and the principles applied in its operation. However, the patent does not show details of a liquid fueled pulse detonation engine.

SUMMARY OF THE INVENTION

The invention provides a liquid fueled pulse detonation air-breathing engine. The engine has at least one, and preferably a multiplicity of, detonation chambers, each of which has an inlet end with an opening for receiving a charge of fuel and air, and an outlet end for discharging combustion product gases. A fast acting valve, such as a rotary valve, is located above the inlet ends of the detonation chambers and cyclically opens the fuel and air receiving openings at the inlet ends of the detonation chambers to allow a charge to enter the chamber, then seals the chamber to allow detonation of the charge. To achieve this, the rotary valve has a body with at least one opening that cooperates with the fuel and air receiving openings in the inlet ends of the detonation chambers so that as the valve rotates, the opening of the valve body rotates across the receiving openings of the detonation chambers. Other rapid opening and closing valves are also useful.

According to one aspect of the invention, when the opening of the valve and the opening in the inlet end of a detonation chamber overlap or coincide, atomized liquid fuel and air enter through the common opening formed and flow into the inlet end of the detonation chamber. When the valve closes (i.e., rotates so that the opening in the inlet end of the detonation chamber is covered by the solid valve body), detonation is initiated in the fuel-charged detonation chamber by an ignitor. At the same time, in the multiple combustor embodiments of the invention, an opening in the rotary valve may then rotate so that it coincides with an opening in another detonation chamber, which can be charged with fuel and air. Thus, in multiple detonation chamber embodiments of the invention, there is a cycle in which detonations occur sequentially in certain chambers while others are being charged. This provides controlled motive force from the impulse generated by the production of combustion product gases to motivate a vehicle attached to the engine.

In certain embodiments of the invention, the liquid fuel is controlledly injected through the opening in the fast acting valve into the inlet end of each detonation chamber, as explained above, but, in other embodiments, the fuel is injected directly into the detonation chamber, in the vicinity of the inlet end. In these direct injection systems, the air supply that provides oxygen to support the detonation is charged, as before, in pulses through the opening in the fast acting valve when the valve is open, but the liquid fuel is supplied by direct injection into the chamber inlet end, aft of the valve.

In another embodiment of the invention, the liquid fueled pulse detonation engine has both inlet and outlet fast acting valves such as rotary valves. The inlet valve is located at the inlet end of the detonation chamber while the outlet valve is located at the outlet end of the chamber for discharging combustion gases. The valves are out of phase so that as the inlet valve opens, the outlet valve closes, and vice versa. If a rotatable valve is used, the valves can be rotated by a common motor.

In accordance with the invention, the air-breathing engines optionally include a source of oxygen. This oxygen is controlledly charged to the inlet ends of the detonation chamber in order to provide an oxygen-rich mixture with fuel, for initial ignition of the fuel. Furthermore, the use of a common controller, preferably including a programmable digital signal processor, to control fuel injection, oxygen injection, and ignition allows optimization of the detonation process for particular purposes. A sensing element senses the position of the rotary valve and then communicates with the controller that in turn activates the fuel injector, oxygen injector, and ignitor, as required.

The invention also provides a method of operating a pulse detonation engine to produce a pulse detonation motive force. This method includes charging a liquid fuel and air mixture to the inlet end of a detonation chamber. During charging, the inlet end of the chamber is clearly open, while the outlet end is optionally closed. A fuel and air mixture is formed within the detonation chamber. If the outlet end of the chamber is closed, then the outlet end is opened so that the fuel and air mixture in the chamber may be detonated. The combustion gases formed in the detonation process are expelled from the open outlet end of the detonation chamber. Thereafter, the inlet end of the detonation chamber is again opened to receive a charge of fuel and air, while the outlet end is optionally closed. These steps are cyclically repeated to produce a continuous series of detonations that provide motive force.

In accordance with the invention, any liquid fuel that will combine explosively with oxygen in air to provide combustion product gases that can supply motive force is useful. Thus, useful liquid fuels include liquid hydrocarbons, gel propellants such as boron slurries, liquid hydrogen, and the like.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
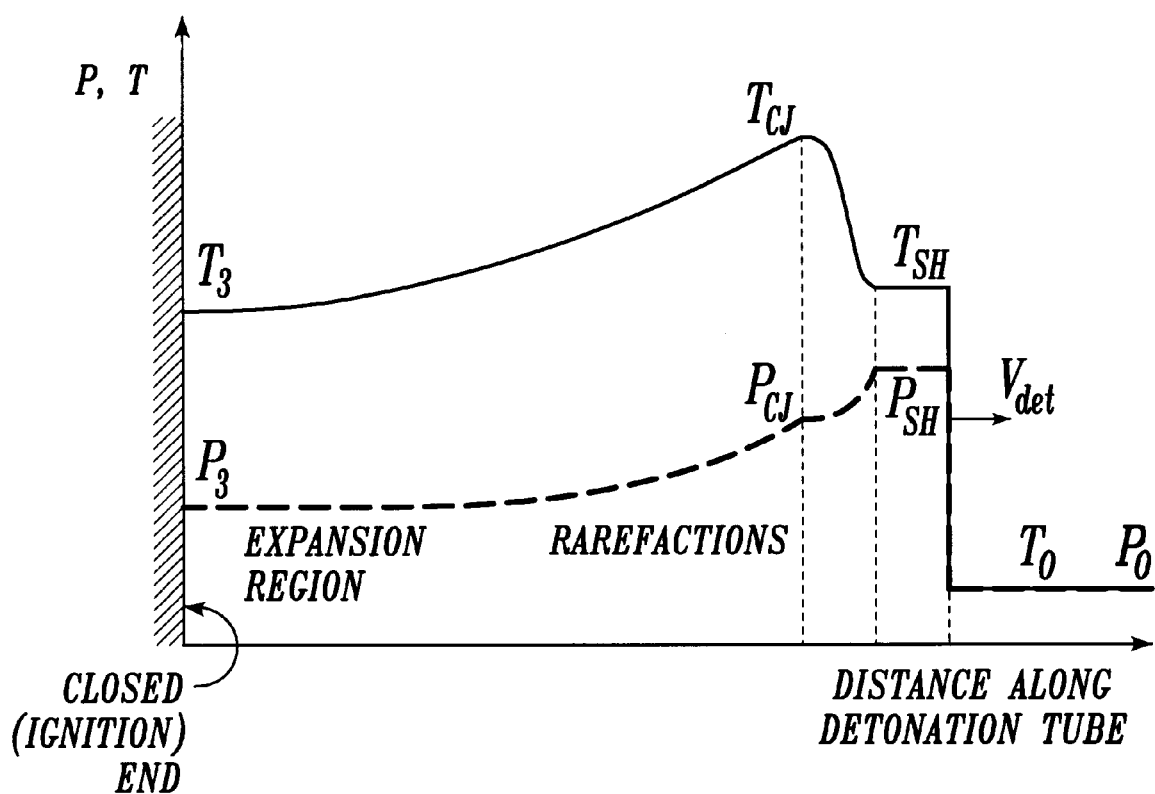
FIG. 1 is an illustrative graphical depiction of a detonation process in a chamber with at least one closed end.

In order to better appreciate the detonative nature of the combustion in the engines of the invention, the principles will be explained with reference to FIG. 1, a snapshot of conditions in a detonation chamber after detonation has been initiated where the horizontal axis is the displacement from the closed end of a detonation chamber, and the vertical axis shows temperature and pressure variation within the chamber. In the detonation chamber, the following conditions exist. At the far right, furthest from the closed ignition end of the detonation chamber, there is a mixture of fuel and air that is still at the initial conditions of pressure and temperature, $P_0$, $T_0$, respectively. However, there is also an advancing wavefront that is propagated at a velocity $V_{det}$. The detonation wave can be considered to consist of a strong shock wave, which triggers combustion, and a thin flame front, or heat addition region, just behind the shock. The shock front moves at the detonation velocity, $V_{det}$ relative to the gas, and increases the pressure and temperature of the gas from its previous values of $P_0$ and $T_0$. An ignition delay region, with length dictated by the reaction chemical kinetics, exists behind the shock. The materials in this wavefront are in a post-shock condition and are at temperature $T_{SH}$, and pressure $P_{SH}$.

The ignition region is followed by a closely coupled flame front which yields combustion products that are in a special thermodynamic state known as the Chapman-Jouguet (CJ) condition. Thus, these products are traveling in the same direction as the wavefront but are at a higher temperature $T_{CJ}$ and lower pressure $P_{CJ}$, than the material in the post-shock condition. The Chapman-Jouguet condition is the only stable state in which the release of chemical energy in a shocked flow results in maintaining the leading shock. It is a fundamental characteristic of the CJ condition that the combustion products travel at a sonic velocity relative to the shock front. In the region of the deterioration wave where chemical reaction begins, heat is released and the temperature increases while the pressure decreases from the shock pressure front. The length of this heat addition region is determined by the total time required to complete the fuel and oxygen combustion reaction. In a detonation process, the temperature is higher and the pressure is lower at the end of the heat addition region. As shown in FIG. 1, in a closed end detonation chamber, the detonation has a trailing rarefaction wave that is at a lower temperature and pressure than the CJ condition. The speed of the detonation wave varies according to the chemical reactants present, the initial thermodynamic state (temperature, pressure, mach number, phase) of the fuel and oxidizer mixture. The engines of the invention are pulsed detonation liquid-fueled engines that operate in accordance with these principles.

Preferably, the liquid fueled engines of the invention are charged with fine liquid fuel droplets, such as produced by atomization. During the atomization of the liquid fuel, small droplets of liquid are created and these travel in the fuel manifold at a high velocity toward the inlet of the detonation chamber. In some embodiments, when the inlet rotary valve closes (i.e., shuts off the opening of the detonation chamber), flow is momentarily interrupted by a sealing mechanism on the valve face. When the valve opens, atomized fuel again enters into the inlet of the detonation chamber. In other embodiments, the fuel injection is controlled electronically to commence when the valve is in a first position (open or on the point of opening), and then close when the valve reaches a second position (closed or nearly closed). This allows additional flexibility in stratifying the charge in the detonation chamber, for example it allows an air (or oxygen) layer to build up behind a fuel-rich zone in the detonation chamber. This provides a "buffer layer" that limits the temperature to which the valve is exposed. Clearly, in the "direct injection" embodiment, discussed below, controlled fuel injection synchronized to the rotary valve cycle is required.

More preferably, in order to initiate and sustain a detonation, the droplets of liquid produced by the atomizer should have diameters of the order of less than about 100 microns, and most preferably, less than about 40 microns, measured as the Sauter Mean Diameter. Droplets of greater than 40 microns Sauter Mean Diameter are also useful, but detonation performance may be reduced.

The atomizers useful in the invention include those atomizers that are able to atomize the liquid fuel to a suitable size for use in a pulsed-detonation engine. Such injectors include fixed or variable orifice pressure-operated atomizers, contra-flow injectors, the "Delavan"-type air blast injectors, pre-vaporizing injectors, ultrasonic atomizers, and the like.

To facilitate an understanding of the invention, reference will be made to the accompanying schematic illustrations. It should be understood, however, that these illustrations are merely for the purposes of explanation, and do not limit the scope of the invention. Thus, the invention covers other embodiments that may be different in geometric shape, ancillary equipment, and other details, but that a person of ordinary skill in the technical art will appreciate, after reading this disclosure, falls within the scope of the invention as disclosed and claimed herein.

Figure 2:
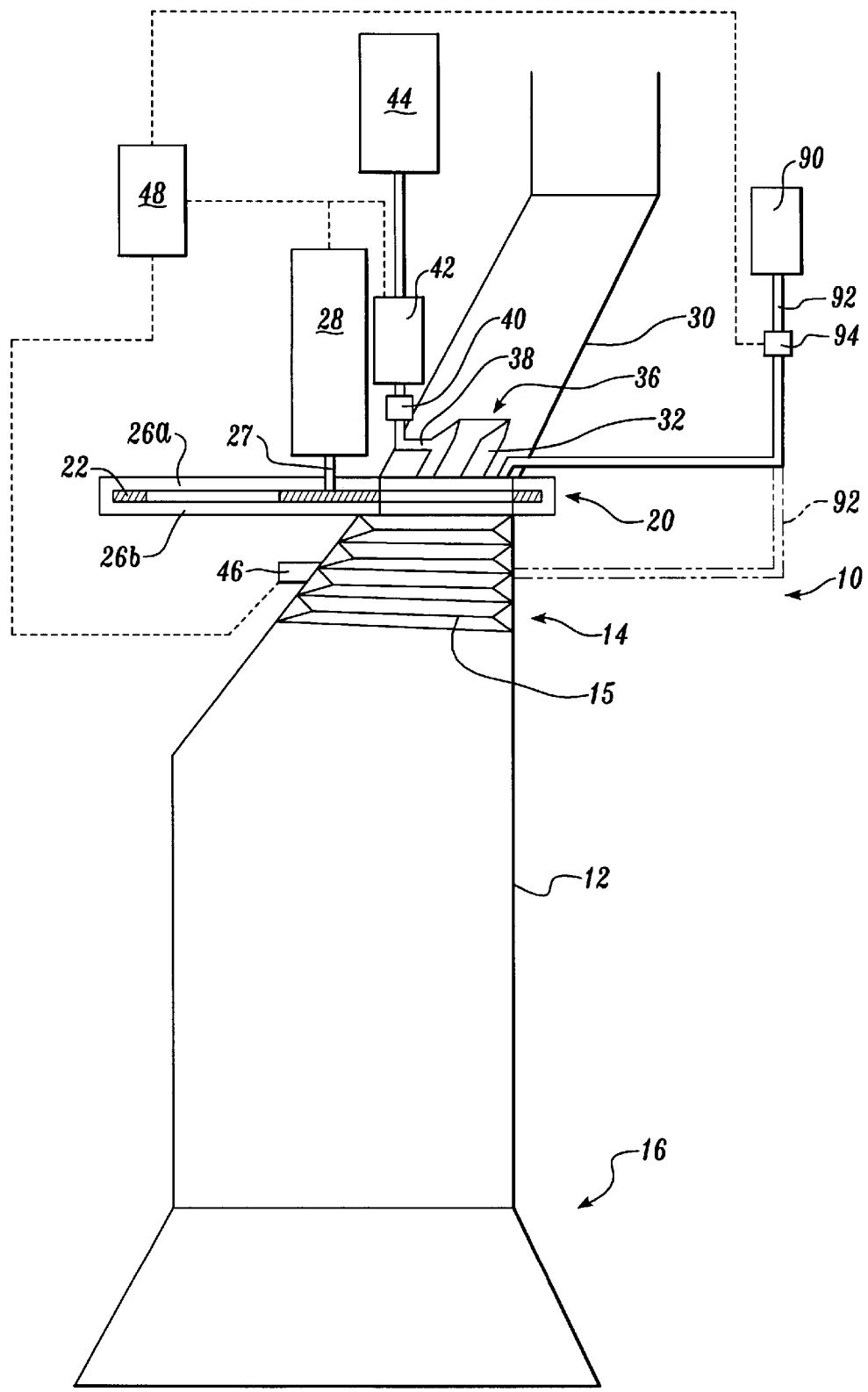
FIG. 2 is a schematic side cross sectional view illustrating an embodiment of a liquid fueled pulse detonation engine in accordance with the invention.
Figure 2A:
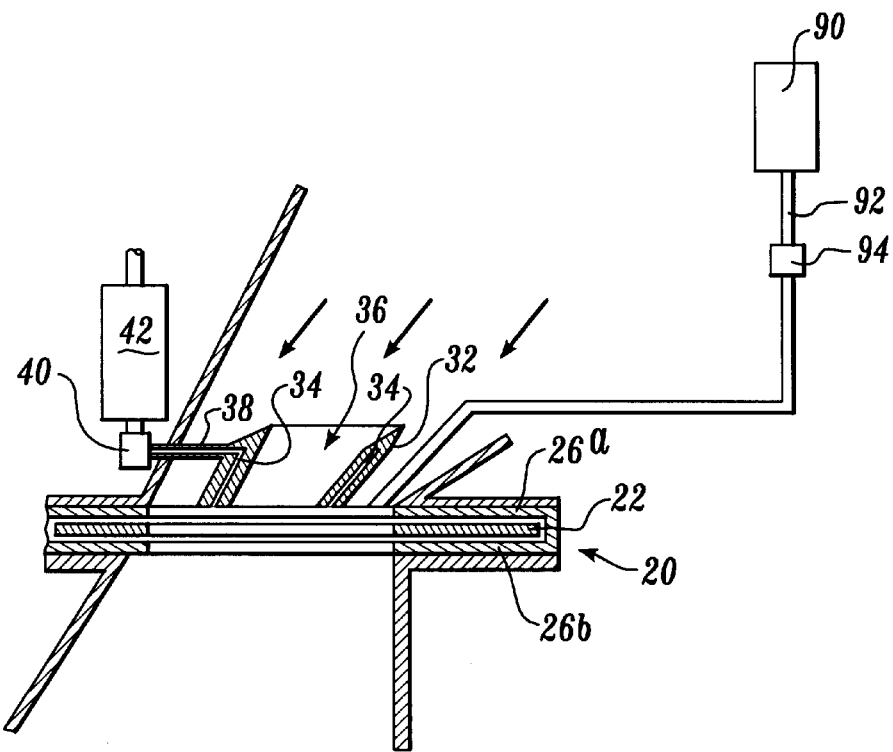
FIG. 2A is an enlarged view, showing more details, of a portion of the embodiment of FIG. 2.
Figure 2B:
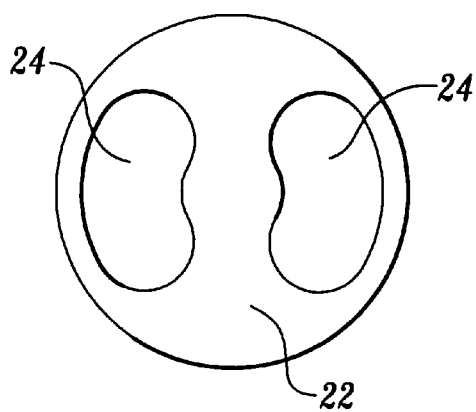
FIG. 2B is a schematic top view of a disk-shaped embodiment of a rotary valve useful in the engine of the invention.

Referring to the embodiment of FIG. 2, a liquid fueled pulsed detonation air-breathing engine 10 has a substantially cylindrical detonation chamber 12 (although other cross-sectional geometries are clearly possible) with an inlet end 14 and an outlet end 16 with an outward-flaring nozzle. Preferably, the inlet end tapers to a narrower cross-sectional area and includes a deflagration-to-detonation transition (DDT) augmentation device 15. Such a device can take a variety of forms, and the preferred embodiment shown indicates that the interior surface of the inlet end 14 is threaded with a helical-type thread to provide a ridged surface. Indeed, any other structure that augments the DDT by providing a zone of turbulence and compression wave augmentation to improve fuel/air mixing and compression is useful. As shown, the DDT transition device 15 is located in the inlet end, or in the vicinity of the inlet end 14, of the detonation chamber 12, to minimize the length of the DDT zone of the detonation chamber. A valve assembly 20 is mounted above the open inlet end 14 of the detonation chamber 12. A particular embodiment of this valve assembly is disclosed in U.S. Pat. No. 5,353,588 (incorporated by reference) at FIG. 18 and column 3, lines 4–31. Generally, as shown in FIG. 2A, a fast acting valve, such as a rotary inlet valve 22, in this instance a disk-shaped valve, is spaced between a combustor mounting plate 26b that is attached to and covers the inlet end of the detonation chamber, and a fuel/air manifold mounting plate 26a that supports the fuel/air manifold. The rotary valve is rotated by a drive motor 28 that is axially coupled to the center of the rotary valve by a drive shaft 27 that extends through the fuel/air manifold mounting plate 26a, as shown in FIG. 2. The embodiment of FIG. 2B shows a disk-shaped rotary valve 22 with two curved elongate bean-shaped openings 24, one in each semi-circle of the disk to form a symmetrical valve body, for allowing a fluid mixture to pass from the fuel/air manifold 32 and the air duct 30 through the rotary valve into the opening at the inlet end 14 of the detonation chamber 12. Clearly, the valve may have only one opening, or may have a multiplicity of openings, so long as it is able to perform the function here described. Also, other fast acting valves may be useful in the engines of the invention.

In the embodiment of FIG. 2, fuel is supplied through an "atomizer" proper that includes a flow control valve, a device for atomizing liquid fuel into droplets, an exit duct and a nozzle that includes a cylindrical fuel/air manifold. The cylindrical fuel/air manifold 32 extends at an angle upwardly from the fuel/air manifold mounting plate 26a. As shown more clearly in FIG. 2A, the manifold 32 is in the form of a sleeve with a central passage 36 for transporting air. The walls of the sleeve contain an annular space 34 that is in fluid communication with a device for liquid fuel atomizing 40 through a short duct 38. The atomizer 40 is in fluid communication with, and receives liquid fuel controlledly through, a control valve 42 from an on board fuel reservoir 44 (shown in FIG. 2). The major proportion of the air required for detonation and combustion is supplied to the inlet end 14 of the detonation chamber 12 through an air duct 30, that preferably partially surrounds the fuel/air manifold 32, to allow some air to enter the detonator chamber through the fuel/air manifold, and also conserve space and promote rapid mixing of combustion air and fuel. Other fuel/air manifolds and air supply arrangements are clearly also feasible and are encompassed in the invention.

The single detonation chamber engine of FIG. 2 operates as follows. At the start of a cycle, a solid portion of the rotary valve 22 covers the opening in the inlet end 14 of the detonation chamber 12. As the valve rotates, a valve opening 24 crosses over the opening in the inlet end of the detonation chamber. At this point, fluid communication is established between the detonation chamber, fuel/air manifold and air duct, through the valve. Air and a fuel/air mixture flows through the rotary alve into the inlet end of the detonation chamber. The valve continues to rotate until the valve closes the opening in the inlet end 14 of the detonation chamber. The fuel/air mixture in the detonation chamber is then ignited by an ignitor 46, such as a spark plug, laser, pyrotechnic device, and the like so that the detonative combustion process commences. The detonation wave produced travels at several thousand feet per second and provides a force, acting against the combustor mounting plate 26b and the closed rotary valve 22, that motivates a vehicle to which the engine is attached.

In an alternative preferred embodiment, fuel injection is not entirely controlled by the opening and closing of the rotary valve. Instead, the position of the rotary valve is sensed and an electronic signal is sent to a fuel and ignition controller 48 that preferably includes a programmable digital signal processor. This controller then sends an electronic signal, based on the position of the rotary valve, to the fuel control valve 42. Thus, when the inlet rotary valve 22 is closed, the signal from the controller 48 stops the fuel injection process. On the other hand, when the inlet rotary valve is sensed as being open, then the signal from the controller 48 initiates and continues fuel injection. Thus, fuel injection does not take place to any significant extent while the rotary valve 22 is closed. Nevertheless, fuel injection may commence microseconds before the rotary valve commences to open to ensure an immediate surge of fuel into the inlet end of the detonation chamber. Likewise, fuel injection may cease before the rotary valve is completely closed to provide a layer of fuel-lean air behind the fuel-rich air already injected into the detonation chamber. Once the detonation chamber is charged with fuel and the rotary valve 22 is closed, the controller 48 activates the ignitor 46 to start the detonation.

As shown, in FIG. 2, the engine also includes an optional oxygen injection system. Oxygen is supplied through a reservoir 19 that contains a source of oxygen. This source may be liquefied oxygen, or chemicals that react to produce oxygen. An oxygen duct 92 extends from the oxygen reservoir 90 to directly above the rotary valve, so that oxygen can be controlledly charged into the inlet end of the detonation chamber 12, when the valve is open. In addition, the oxygen supply duct 92 is supplied with an oxygen control valve 94 so that oxygen supply is restricted to those portions of the engine cycle when oxygen supply would be of most benefit, for example, at the end of a fueling cycle to provide an oxygen-rich fuel mixture at the inlet end of the detonation tube at commencement of ignition.

In an alternative embodiment, the oxygen is not injected through the rotary valve 22, but is injected directly into the inlet end of the detonation tube as shown. Preferably, the supply of oxygen is controlled by the fuel injection and ignition controller 48. Thus, the digital signal processor of controller 48 may be programmed to inject oxygen at appropriate times during the cycle of the engine.

Figure 3:
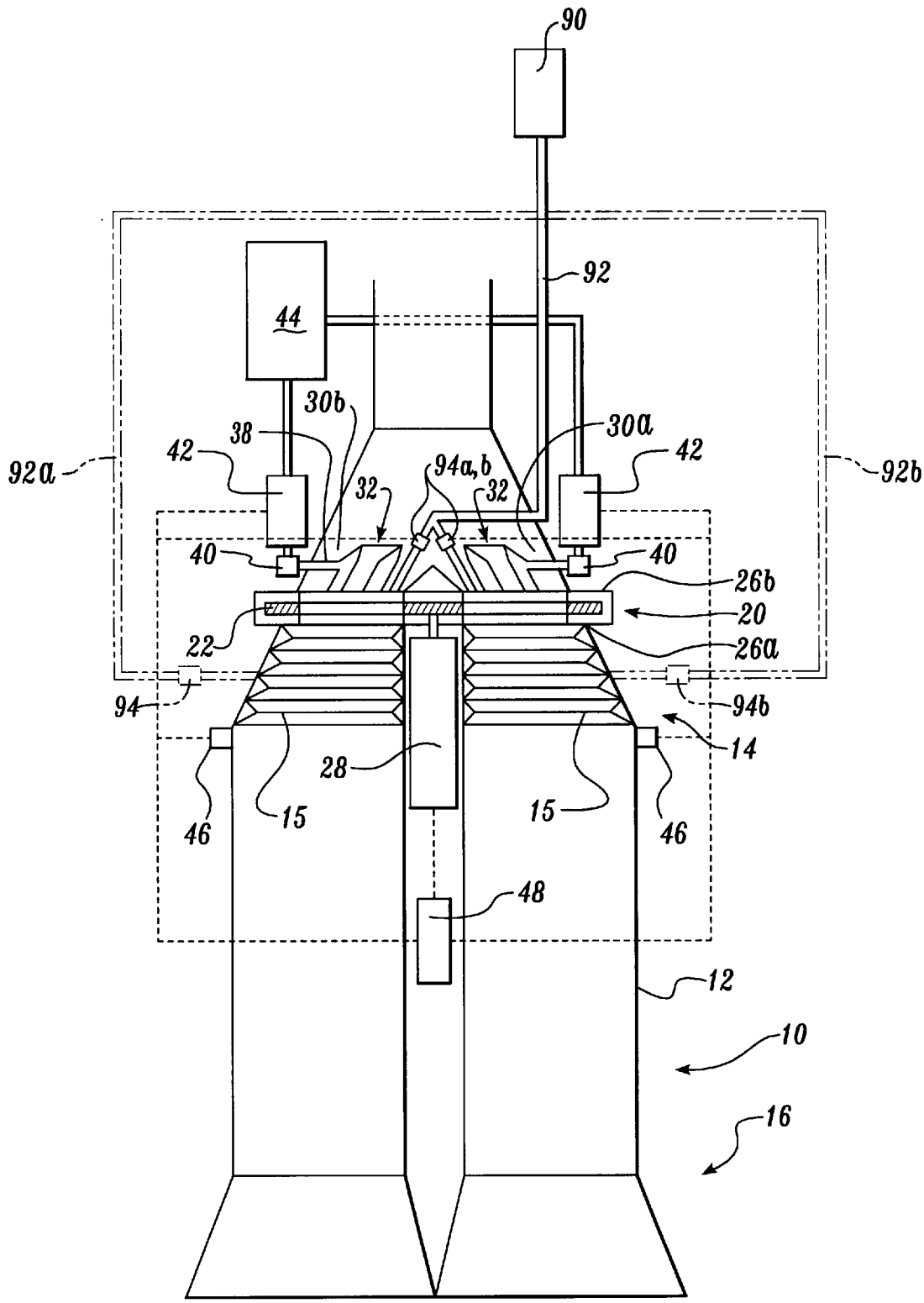
FIG. 3 is a schematic side cross sectional view illustrating another embodiment of the liquid fueled pulse detonation engine of the invention with more than one detonation chamber.

FIG. 3 shows an alternative embodiment of the invention that has a plurality of detonation chambers and a single rotary valve, other valves are clearly also useful, as mentioned above. In the embodiment shown, each detonation chamber has a separate fuel injector. Clearly, other configurations and variations of the configurations shown are also possible. In the embodiment of FIG. 3, the structure of each detonation chamber 12 is similar to the detonation chamber of FIG. 2. In this instance, the air duct 30 separates into two legs 30a and 30b, each at least partially surrounding one of the fuel/air manifolds 32. The rotary valve drive motor 28 is, for convenience, located between the detonation chambers 12 and an axial drive shaft 27, coupled to the rotary valve 22, extends upward through the fuel/air inlet manifold base plate 26b of the two detonation chambers. The cycle of operation of the multiple detonation chamber engine is similar to that of the single chamber engine described above. When there are two detonation chambers then detonation takes place sequentially in each chamber. When there are more than two chambers, detonation may take place in two or more chambers simultaneously, while other chambers are being charged with a fuel/air mixture. Indeed, a variety of detonation sequences are possible depending upon the number of detonation chambers, the design of the rotary valve, and the firing sequence required for stable operation, and good performance.

As explained in relation to the single detonation chamber embodiment of FIG. 2, the embodiment of FIG. 3 may also incorporate an electronic fuel injector and ignition controller 48 so that fuel metering into the detonation chambers 12 is electronically controlled based upon the position of the rotary valve 22. Thus, when the valve is sensed as opening one of the detonation chambers, then the fuel injector of that chamber is activated to provide atomized fuel into the inlet end of the chamber. On the other hand, when the valve is sensed as being closed, or substantially closed, then the controller shuts off the flow of fuel from the injector. As indicated above, this type of fuel metering allows more precise stratification of the fuel/air mixture within the detonation chambers and allows better control of the detonation process. Again, once the detonation chamber is fueled and the rotary valve closes, the controller 48 activates the ignitor 46 to commence the detonation reaction.

Figure 4:
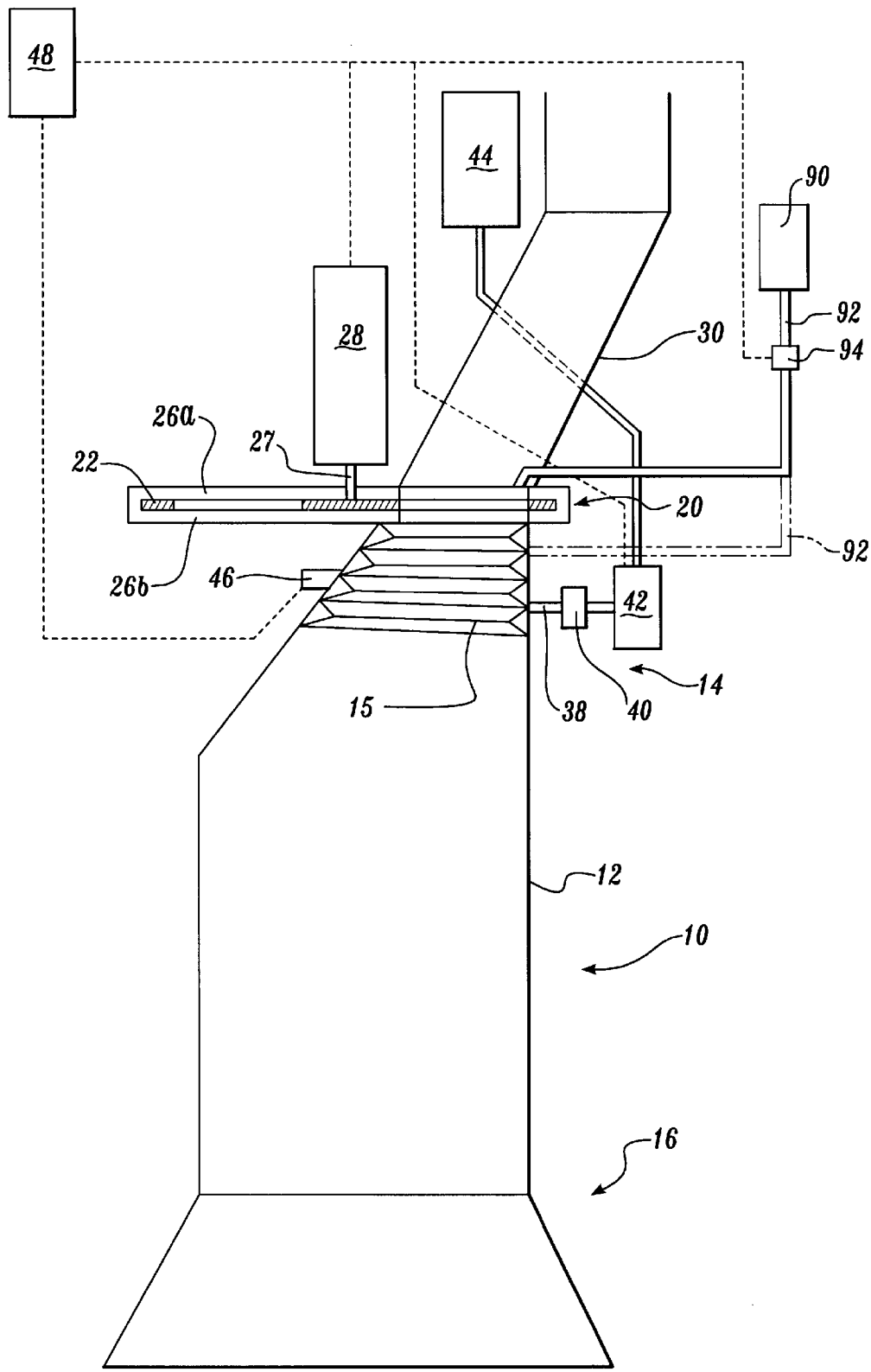
FIG. 4 is a schematic side cross sectional view of an embodiment of a single detonation chamber version of an engine of the invention with direct fuel injection.
Figure 5:
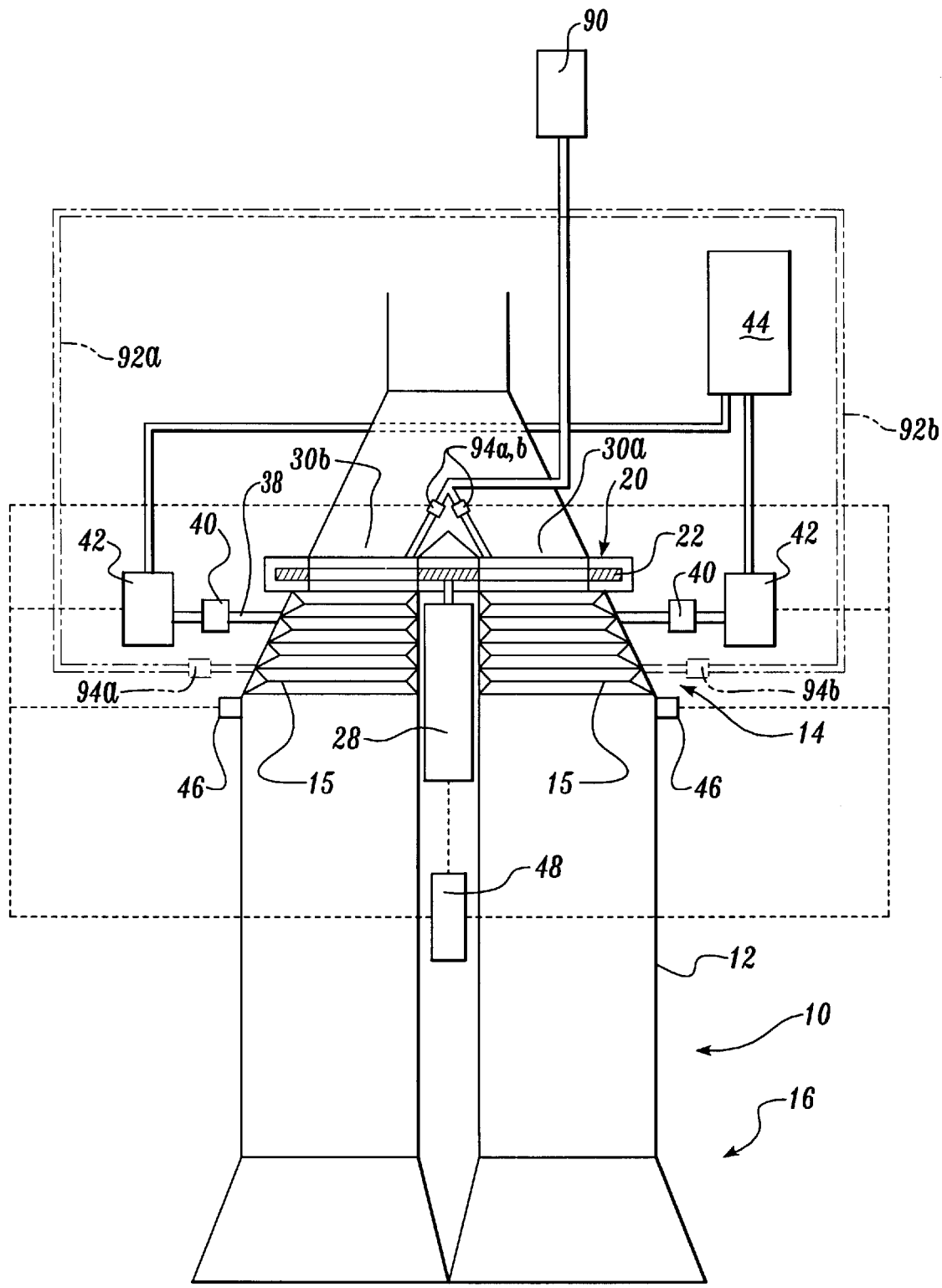
FIG. 5 is a schematic side cross sectional view of an embodiment of an engine of the invention with direct fuel injection into more than one detonation chamber.

Alternative direct fuel injection embodiments of the invention are shown in FIGS. 4 and 5. In most respects the embodiment of FIG. 4 is identical to that of FIG. 2, and the embodiment of FIG. 5 is identical to that of FIG. 3. However, fuel injection is not through the opening in the inlet rotary valve 22. Instead, in both FIGS. 4 and 5 fuel is injected directly into the inlet end 14 of the detonation chamber 12 by an injector 40 located adjacent the inlet end of the chamber. As explained above, in both instances, the position of the rotary valve is electronically sensed and a signal is transmitted to a fuel injector and ignition controller 48. This controller sends a signal to the fuel control valve 42 to adjust the valve and hence the fuel injection rate. Thus, when controller 48 senses that the rotary valve is completely open to a particular detonation chamber 15, then fuel is directly injected into the inlet of that chamber. When the valve is sensed as being closed, then fuel is shut off. As explained before, fuel injection can commence microseconds before the valve opens, and can likewise cease microseconds before the valve completely closes. Moreover, the degree to which the valve 42 opens to allow fuel injection can be varied depending upon the position of the rotary valve 22. Further, the controller 48 is programmed to activate the ignitor and commence the detonation at a predetermined time in the cycle, after the rotary valve is closed. Thus, the embodiments of FIGS. 4 and 5 provide advantages with respect to the optimization of the detonation process in that fuel injection is not through the rotary valve and is more amenable to optimization by electronic controls.

The direct injection embodiments of the engine of invention also allow for the injection of oxygen, as above. As shown, oxygen from the reservoir 90 is carried in a conduit 92, through a metering valve 94, preferably directly to the inlet end 14 of the combustion chamber 12. The flow of oxygen is controlled by the controller 48, through its control of the oxygen control valve.

Figure 6:
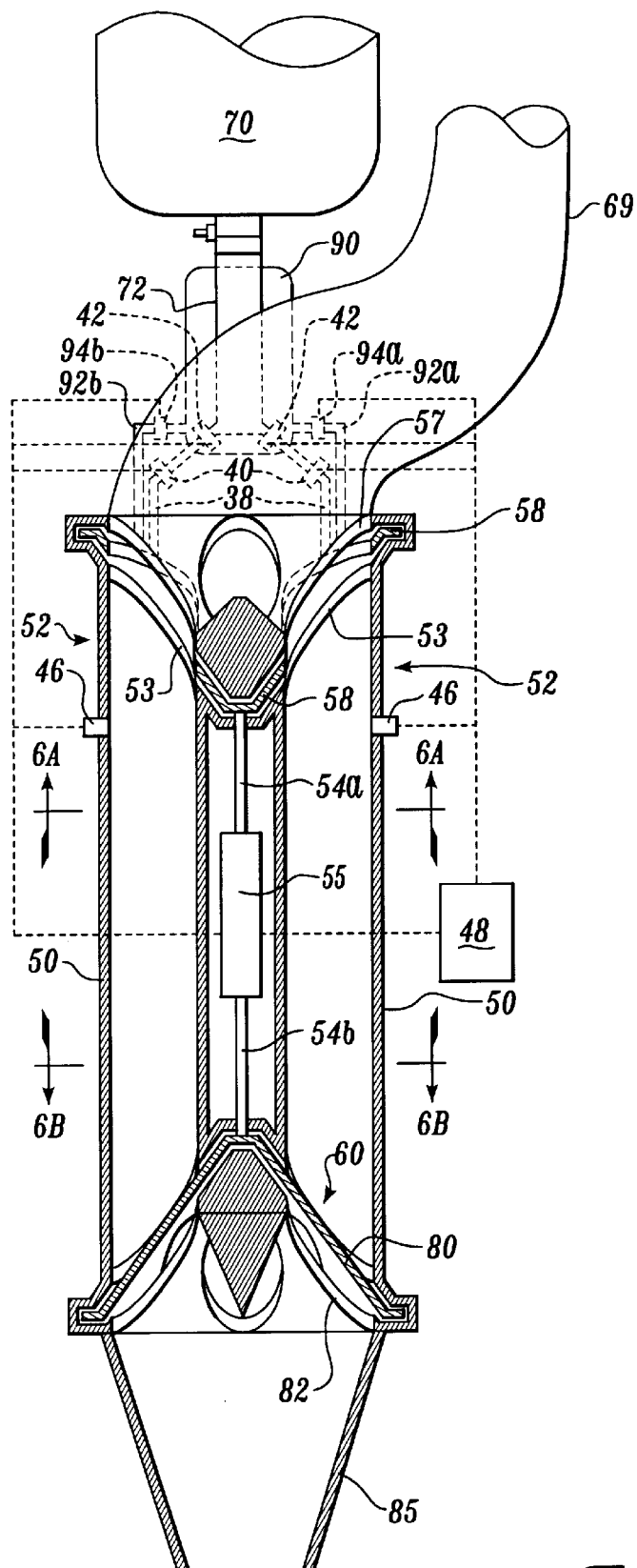
FIG. 6 is a schematic side cross sectional view illustrating an embodiment of a liquid fueled pulse detonation engine that has a cone-shaped inlet and outlet rotary valves.

FIG. 6 shows a preferred embodiment of a liquid pulse detonation engine of the invention. In this embodiment of a multiple combustor engine, two valves are employed: an inlet valve and an optional outlet valve. As shown, the engine has four parallel substantially cylindrical detonation tubes 50 (although other geometries are clearly useful) that are spaced apart. Each of the detonation tubes has an inlet end 52 that interfaces with the outer surfaces of a cone-shaped inlet end base plate 53 so that each of the upper ends tapers to a narrow extremity. Likewise, the lower ends of the tubes 50 taper to a narrow extremity by interfacing with a cone-shaped combustion gas exit base plate 60. A rotary valve drive assembly is located in a space between the detonation tubes and includes a centrally mounted drive motor 55 with axial drive shafts 54a, 54b extending from each end thereof. The drive shafts are substantially parallel to the sides of the detonation chambers. The axial shaft 54a extends upward and is coupled to the center of an cone-shaped inlet rotary valve 58 (shown in the open position) that is nested above the inlet end base plate 53. A fuel/air manifold support plate 57, also cone shaped, is nested above the rotary valve 58. Air is supplied to each detonation tube through a common air duct 69 with an outlet that is in fluid communication with the upper surface of the fuel/air manifold support plate 57. Fuel is supplied to the detonation chambers from a fuel reservoir 70 through a common fuel duct 72 that branches into separate fuel supply lines for each detonation tube (only two shown in the side view) 74a, 74b, supplying fuel to fuel injectors each comprised of an injector 40 and a control valve 42, that are mounted to the support plate 57.

Figure 6A:
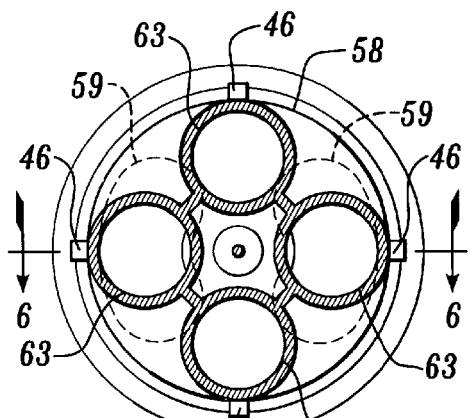
FIG. 6A is a schematic cross-sectional view showing the inlet coneshaped rotary valve of FIG. 6 taken along 6A—6A.

FIG. 6A is a cross-sectional view of the engine of FIG. 6, taken along lines 6A—6A. It is clear, that this embodiment of the invention has four detonation tubes each having an opening 63 at its upper or inlet end 52. The detonation tubes are arrayed at the corners of a square, and as explained below, are fired in a predetermined sequence to propel the vehicle. The disk-shaped rotary valve 58 has two matched openings 59 that are symmetrical and bean-shaped, one in each semi-circle of the valve surface. The openings are each able to fully overlap one of the openings 63, at any time. Clearly, the valve may also have only one opening (it will then rotate faster) or may have more than two openings. In the embodiment shown, two of the detonation tubes 50 may be simultaneously fueled, while the other two are undergoing detonation.

At the outlet end of the engine, a cone-shaped rotary valve 80, nested with the exit combustion gas base plate 60, is coupled to the axial shaft 54b that extends from the common drive motor 55. Shafts 54a and 54b rotate in concert so that the opening and closing of valves 58 and 80 are synchronized. An optional cone-shaped outer combustion gas base plate 82 is nested on the other side of the outlet rotary valve 80. Rotary valve 80 is able to rotate freely between plates 60 and 82. A common tapered nozzle 85 extends from the vicinity outlet of the rotary valve 80 to allow controlled discharge of combustion products from all detonation tubes therethrough, and is designed to provide the correct cross sectional area ratio with the combustion products exit to match ambient pressure.

Figure 6B:
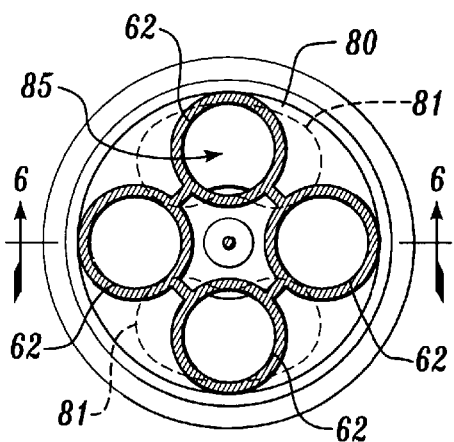
FIG. 6B is a cross-sectional view showing the outlet rotary valve of FIG. 6, taken along 6B—6B.
Figure 6C:
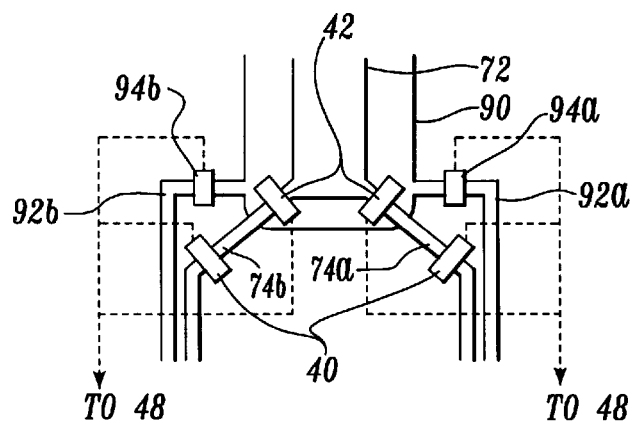
FIG. 6C shows the fuel and oxygen supply for FIG. 6

The fuel supply and oxygen supply system is more clearly seen in FIG. 6C. As shown, fuel from the reservoir 70 enters into common fuel supply duct 72 that divides into four legs (only two shown) 74a and 74b. Each of these is supplied with a control valve 42 for controlledly supplying fuel to an atomizer 40 that in turn atomizes the fuel and supplies it to the inlet end of the detonation tube, through the rotary valve 58. The engine also has a source of oxygen contained in an oxygen reservoir 90 that supplies oxygen controlledly through four supply conduits, one to each of the detonation tubes (only conduits 92a and 92b are shown). Each of the conduits is supplied with an oxygen control valve 94a and 94b. Through these control valves, the controller 48 is able to control the supply of oxygen to each of the detonation tubes, and is able to time the point in the cycle at which oxygen is supplied.

FIG. 6B is a schematic cross-sectional view showing the cone-shaped optional exit rotary valve 80 with the openings 62 in the base plate 60 and the outer combustion base plate 82. The openings 81 of the rotary valve are in dotted outline. The valve 80 is clearly out of phase with valve 58, shown in FIG. 6A.

Returning to FIG. 6, in the embodiment shown, the detonation tubes have a common exit nozzle 85 that diverges relative to any one of the nozzles individually. Thus, although the nozzle is cone-shaped and tapers inwardly, the nozzle provides an expanded volume and cross sectional area for gas flow relative to any one of the detonation tubes individually. Combustion product gases from a detonation tube pass through openings in the outlet rotary valve 80, that is synchronized to open and close out of phase with the opening and closing of the inlet rotary valve 58, and enters into the nozzle 85 for exiting from the engine.

During operation, the common rotary valve drive motor 55 rotates both drive shafts 54a and 54b, thereby synchronously rotating the inlet conical rotary valve 58 and the outlet valve 80. The valves therefore rotate at the same velocity and their openings are aligned so that they are out of phase, i.e., when one opens the other closes. For instance, when the fuel/air mixture in a detonation tube is detonated, the inlet rotary valve is in the closed position and the outlet rotary valve is open, or has commenced opening. Thus, combustion products exit through the outlet rotary valve into the nozzle, thereby providing propulsive force. On the other hand, when the inlet rotary valve is open, so that fuel and air are admitted into the detonation tube, then the outlet rotary valve is closed, or continuing to close.

As before, the sequence leading to detonation can be optimized or adjusted depending upon the results required. For example, the inlet and outlet rotary valves need not be completely out of phase. For example, detonation can commence microseconds before the inlet valve is closed and microseconds before the outlet valve is completely opened. As indicated in FIG. 6, a fuel injector and ignitor controller 48 is preferably used to sense the position of the rotary valves and predetermine the fuel injection and the ignition. Thus, the positions of the rotary valves are sensed and electronic signals are transmitted to the controller 48. Based on this input, the controller electronically controls the fuel injectors 76a, 76b and the ignitors 46. In particular, in a preferred embodiment, oxygen is post-dosed into the detonation chambers, after the larger proportion of the fuel air mixture has already been charged to the chamber. This oxygen greatly increases the detonatability of the fuel mixture. This post-charging with oxygen is also controlled through the controller 48 that senses the position of the rotary valve as it begins to close and activates the oxygen feed valve to release oxygen into the detonation chamber. Once the rotary valve closes completely, the controller 48 shuts off the oxygen feed valve. Clearly, the controller can be programmed to dose oxygen into the detonation chamber at any time when the fuel and air mixture is being charged to the chamber. Thus, further stratification of the charge, if required, is easily accomplished. As shown, oxygen is either charged through the valve or by "direct injection" (broken lines 92a and 92b) directly into the inlet end of the detonation chamber.

Figure 7:
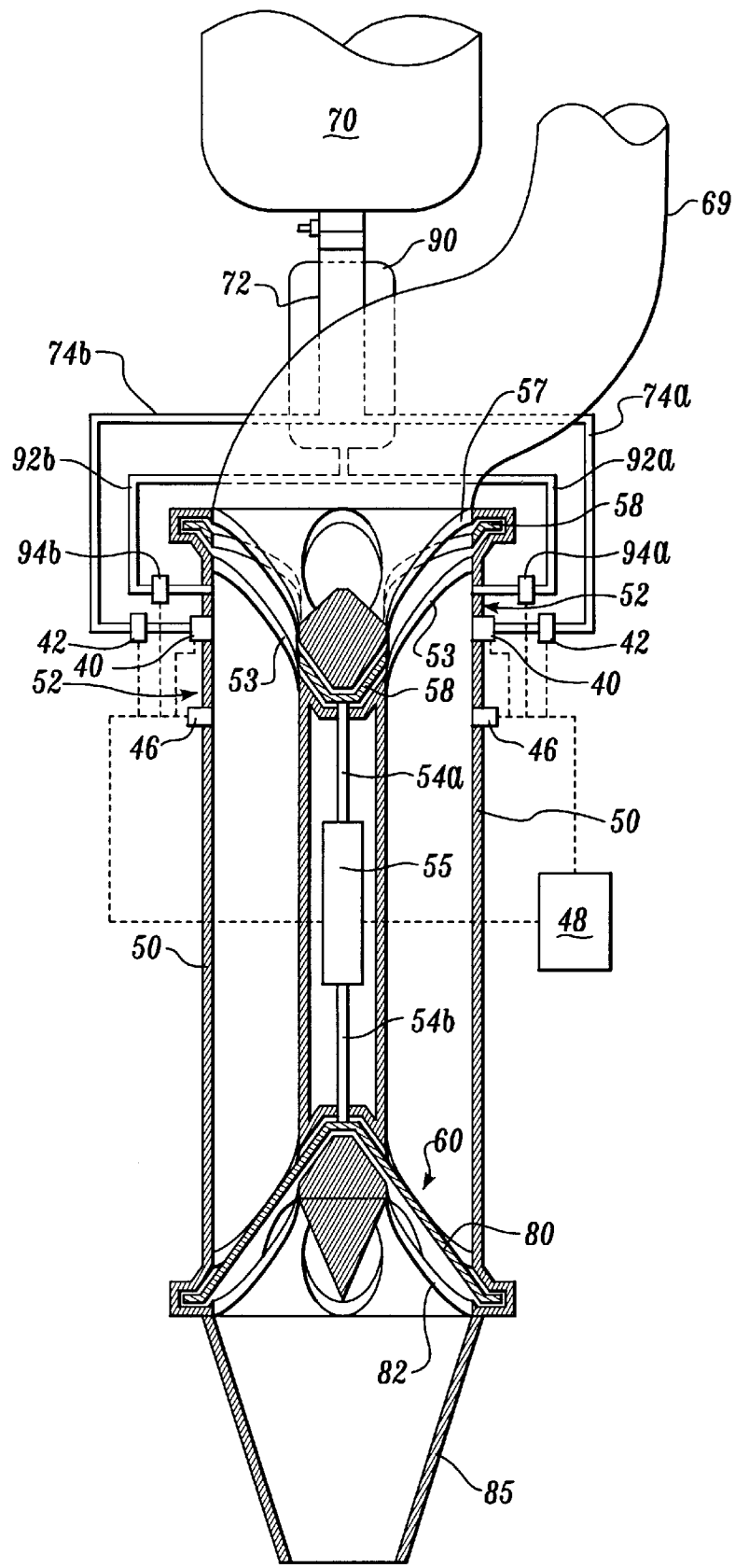
FIG. 7 is a schematic side cross sectional view of an embodiment of the liquid fueled pulsed detonation engine of the invention with dual rotary valves and direct full injection.

The alternative embodiment shown in FIG. 7 is substantially identical to that of FIG. 6, except that fuel is injected by the "direct injection method" through atomizers into the inlet ends of the detonation tubes, rather than through the opening of the rotary valve. Otherwise, the operation of the alternative embodiment is similar to that described above.

The invention also provides a method of producing a pulsed denotation mode of force. This method includes charges a liquid fuel and a mixture into the inlet end of a detonation chamber. A fuel and air mixture is formed within the chamber, and the inlet end of the detonation chamber is then closed. The other end of the detonation chamber, if previously closed, is now opened. The fuel-air mixture in the chamber is detonated thereby providing combustion gases and a shock wave that travels at several thousands of feet per second. This shock wave propels the engine while the combustion gases are expelled from the open outlet end of the chamber. The inlet end of the chamber is then again opened to receive a charge of liquid fuel and air, and the cycle is repeated.

In certain embodiments, the method includes dosing a metered amount of oxygen into the detonation chamber, after a fuel and air mixture has formed in the chamber. Thus, an oxygen-rich fuel and air mixture is formed toward the inlet end of the detonation chamber. This assists in the detonation of the full and air mixture.

The method of the invention also encompasses detonation tubes that have valves at both inlet and outlet ends. Thus, according to the method, liquid fuel and air is charged into the inlet end of a detonation chamber, while the inlet end is open, and the outlet end is substantially closed. A fuel and air mixture is then formed in the detonation chamber and the inlet end commences closing, while the outlet end commences opening. Once the outlet end is opened, to a predetermined extent, and the inlet end is closed, the fuel and air mixture in the chamber is ignited, resulting in a detonation. The combustion gases of the detonation are expelled through the open outlet end of the detonation chamber. Thereafter, the outlet end of the detonation chamber commences closing while the inlet end begins to open to allow charge with a fresh supply of air and fuel. As explained above, the method includes dosing with a metered amount of oxygen into the detonation chamber before igniting the fuel and air mixture.

As explained above, the method of the invention includes controlling the detonation of the fuel and air mixture by sensing the position of the valve at the inlet end of the detonation chamber, and also the valve at the outlet end of the chamber, in the event the chamber has two valves. The timing sequence of fuel injection, ignition, and oxygen metering into the detonation chamber is then controlled by a controller 48, such as a programmable digital signal processor, to optimize the firing cycle of the engine.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A liquid fueled pulse detonation engine comprising:
  (a) at least two detonation chambers, each detonation chamber having an inlet end and an outlet end, the inlet end having an opening for receiving a detonable charge comprising a mixture of fuel and an oxidant, the chamber comprising a deflagration to detonation transition device along sidewalls of the inlet end of the chamber;
  (b) an exit valve at the outlet end of each detonation chamber, the opening and closing of the exit valve out of phase with an inlet valve of said chamber;
  (c) a reservoir of liquid fuel;
  (d) a fuel injector in fluid communication with the fuel reservoir, the fuel injector supplying a controlled amount of fuel to each detonation chamber;
  (e) a manifold for supplying air to each detonation chamber, the manifold in fluid communication with the inlet end of the chamber;
  (f) an ignitor in each detonation chamber for initiating successive detonations of charges in the detonation chamber;
  (g) an inlet valve for each detonation chamber enabling intermittent fluid communication between the manifold and the detonation chamber, the valve comprising a valve opening sized to cooperate with the opening for receiving a charge of the inlet end of the detonation chamber, so that when the engine operates, the valve opening allows fluid flow into said opening of the detonation chamber in the inlet end of said detonation chamber; and
  (h) a controller receiving signals indicating positions of the inlet and exit valves and activating the fuel injector and the ignitor of each detonation chamber in response to the signals.

2. The engine of claim 1, wherein the inlet valve is a rotatable valve.

3. The engine of claim 2, further comprising a source of oxygen, and an oxygen injector able to inject oxygen from the source into the at least two detonation chambers.

4. The engine of claim 3, further comprising a source of oxygen, and an oxygen injector, wherein a controller activates the oxygen injector to inject oxygen into the at least two detonation chambers.

5. The engine of claim 1, wherein the fuel injector communicates with the detonation chamber through the inlet valve by infecting atomized liquid fuel through the valve opening into the inlet end of the detonation chamber.

6. The engine of claim 2, wherein the rotatable valve comprises a disk-shaped body.

7. The engine of claim 1, wherein the fuel injector is able to supply atomized liquid fuel, the atomized fuel comprising droplets with a Sauter mean diameter of less than about 40 microns.

8. The engine of claim 1, wherein the outlet end of each detonation chamber comprises an outwardly flaring nozzle.

9. The engine of claim 1, wherein the controller activates the fuel injector and ignitor of each detonation chamber in a predetermined cycle.

10. The engine of claim 9 wherein fuel injectors are located to inject fuel into the at least two detonation chambers through the inlet valve.

11. The engine of claim 9, wherein fuel injectors are located in the vicinity of inlet ends of the at least two detonation chambers to enable fuel injection directly into the inlet ends of said at least two detonation chambers, the injected fuel bypassing the inlet valve.

12. The engine of claim 1, wherein the inlet and outlet valves are rotatable valves.

13. The engine of claim 12, wherein the inlet and outlet valves are cone-shaped.

14. The engine of claim 12, wherein the inlet and outlet rotatable valves are coupled to a common drive motor for rotating the valves.

15. The engine of claim 1, further comprising a source of oxygen, and an oxygen injector able to inject oxygen into each detonation chamber.

16. The engine of claim 15, further comprising an oxygen supply controller, the controller activating and controlling the oxygen injector to supply a controlled amount of oxygen into the detonation chamber.

17. A liquid fueled pulse detonation engine, comprising:
  (a) a detonation tube having an inlet end and an opposite outlet end, the inlet end having an opening for receiving a charge comprising a detonable mixture of fuel and an oxidant, the outlet end having an opening for discharging combustion product gases, the tube comprising a deflagration to detonation transition device extending along sidewalls of the inlet end of the tube;
  (b) an inlet valve mounted to sequentially open and close the opening in the inlet end of the detonation tube;
  (c) an outlet valve through which combustion products are expelled from the outlet end of the detonation tube;
  (d) an air duct in intermittent fluid communication with the detonation tube through the inlet valve;
  (e) a reservoir of liquid fuel mounted to the engine;
  (f) a fuel delivery system in fluid communication with the reservoir for injecting controlled amounts of atomized liquid fuel into the inlet end of the detonation tube; and
  (g) an ignitor near the inlet end of the detonation tube for igniting a fuel and air charge in the tube; and
  (h) an ignitor controller receiving signals from a sensor for sensing positions of the inlet and outlet valves, the controller controlling the fuel delivery system and activating the ignitor in response to received signals from the sensor about valve positions.

18. The engine of claim 17, wherein the detonation tube is substantially cylindrical and the inlet and outlet ends are both tapered.

19. The engine of claim 17, wherein the inlet and outlet valves comprise rotatable valves, the valves each comprising valve bodies, each of the bodies having at least one opening therethrough.

20. The engine of claim 17, wherein fuel injection is by direct injection into an inlet end of the detonation tube, the injected fuel bypassing the inlet valve.

21. The engine of claim 17, further comprising an oxygen injection system comprising:
  (a) a source of oxygen; and
  (b) an oxygen control valve in fluid communication with the source of oxygen and the inlet end of the detonation tube, the oxygen control valve controlledly supplying oxygen into the inlet end of the detonation tube.

22. The engine of claim 17, comprising a plurality of detonation tubes.

23. The engine of claim 17, comprising four parallel substantially cylindrical detonation tubes arrayed at corners of a square.

24. The engine of claim 17, wherein the inlet and outlet valves each comprise a valve body, the valve bodies each cone-shaped with apexes of the bodies directed toward each other.

25. A method of producing a pulse detonation motive force in an air-breathing, liquid-fueled, engine comprising:

(a) charging an amount of liquid fuel and air into an inlet end of a detonation chamber while an opposite outlet end of the chamber is substantially closed, the amount of fuel controlled by a fuel injection system, the fuel injection system independent of an air supply metering system;

(b) forming, under computer control, a detonable fuel and air mixture in the detonation chamber;

(c) under computer control commencing opening an exit valve at the outlet end of the detonation chamber while commencing closing an inlet valve at the inlet end of the chamber, based on sensed signals indicating valve conditions at the outlet and inlet ends;

(d) utilizing internal structure at the inlet end of the detonation chamber to facilitate deflagration to detonation mode transfer;

(e) detonating the fuel and air mixture in the detonation chamber by activating an ignitor, under computer control, based on signals of inlet and outlet valve position transmitted to the computer;

(f) expelling combustion product gases from the detonation chamber;

(g) under computer control commencing opening the inlet valve of the detonation chamber while commencing closing the exit valve of the chamber; and (h) repeating the cycles of steps (a) through (g).

* * * * *

UNITED STATES PATENT AND TRADEMARK OFFICE
CERTIFICATE OF CORRECTION

PATENT NO. : 5,901,550
DATED : May 11, 1999
INVENTOR(S) : T.R.A. Bussing et al.

Page 1 of 3

It is certified that error appears in the above-identified patent and that said Letters Patent is hereby corrected as shown below:

COLUMN     LINE

[56]    Refs. Cited (U.S. Patents)    Please insert the following references:
cols. 1 & 2

--5,345,758    9/1994    T.R. Bussing
5,353,588    10/1994    T.R. Bussing--

[56]    Refs. Cited (U.S. Patents)    Please insert the following references:
cols. 1 & 2

--2,684,571    1950    Wright
3,119,436    1/1964    Rydberg
3,606,867    3/1970    Briffa
4,787,579    11/1988    Smith--

[56]    Refs. Cited (Other Publs.)    Please insert the following references:
col. 2

--Sutton, G.P., "Rocket Propulsion Elements: An Introduction to the Engineering of Rockets," Wiley-Interscience Publications, New York, New York, 1992.

Mattingly, J.D., "Elements of Gas Turbine Propulsion," McGraw-Hill, Inc., New York, undated.

Oates, G.C., Editor, "Aircraft Propulsion Systems Technology and Design," AIAA Education Series, AIAA, Washington, DC, 1989.

UNITED STATES PATENT AND TRADEMARK OFFICE
CERTIFICATE OF CORRECTION

PATENT NO. : 5,901,550
DATED : May 11, 1999
INVENTOR(S) : T.R.A. Bussing et al.

It is certified that error appears in the above-identified patent and that said Letters Patent is hereby corrected as shown below:

COLUMN    LINE

[56]    Refs. Cited    Johnson, W., "Analytical and Experimental Study of the
col. 2    (Other    Pulsejet Ejector," Ph.D. Dissertation, Department of
     Publs.)    Mechanical Engineering, University of Clemson, 1967.
     *(continued)*

Lockwood, R.M. "Interim Summary Report on Investigation of the Process of Energy Transfer from an Intermittent Jet to a Secondary Fluid in an Ejector-type Thrust Augmentor." Hiller Aircraft Corp. Report No. ARD-286, March 31, 1961.

Lockwood, R.M. "Interim Summary Report on Investigation of the Process of Energy Transfer from an Intermittent Jet to a Secondary Fluid in an Ejector-type Thrust Augmentor." Hiller Aircraft Corp. Report No. ARD-305, June 30, 1962.

Clark, L.T., "Application of Compound Flow Analysis to Supersonic Ejector-Mixer Performance Prediction," AIAA Paper 95-0645, 1995.

Bernstein, A., Heiser, W., and Hevenor, C., "Compound-Compressible Nozzle Flow," AIAA Paper 66-663, 1966.

FOA, J.V., "Intermittant Jets", Vol. XII High Speed Aerodynamics and Jet Propulsion, 1959.

UNITED STATES PATENT AND TRADEMARK OFFICE
CERTIFICATE OF CORRECTION

PATENT NO. : 5,901,550
DATED : May 11, 1999
INVENTOR(S) : T.R.A. Bussing et al.

It is certified that error appears in the above-identified patent and that said Letters Patent is hereby corrected as shown below:

COLUMN    LINE

[56]    Refs. Cited    O'Brien, J.G. "The Pulse Jet Engine A Review of Its
col. 2    (Other    Development Potential", Naval Postgraduate School,
          Publs.)    June 1974.--

11    49    "infecting" should read --injecting--
(Claim 5, line 3)

Signed and Sealed this

Sixteenth Day of May, 2000

*Attest:*

Q. TODD DICKINSON

*Attesting Officer*    *Director of Patents and Trademarks*